United States Patent
Zhou et al.

(10) Patent No.: US 8,359,008 B2
(45) Date of Patent: Jan. 22, 2013

(54) SECURITY SYSTEM AND METHOD FOR AN ELECTRONIC DEVICE

(75) Inventors: Hai-Qing Zhou, Shenzhen (CN); Lian-Sheng Zhang, Shenzhen (CN); Song-Lin Tong, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

(*) Notice: Subject to any disclaimer, the term of this patent is extended or adjusted under 35 U.S.C. 154(b) by 112 days.

(21) Appl. No.: 13/075,187

(22) Filed: Mar. 30, 2011

(65) Prior Publication Data

US 2012/0108202 A1    May 3, 2012

(30) Foreign Application Priority Data

Nov. 2, 2010 (CN) .......................... 2010 1 0528321

(51) Int. Cl.
*H04M 1/66* (2006.01)
*H04M 1/68* (2006.01)

(52) U.S. Cl. ........ 455/410; 455/558; 455/411; 455/445; 455/428; 455/456.2; 370/310

(58) Field of Classification Search ................... 455/558, 455/411, 445, 428, 456.2, 410; 370/310
See application file for complete search history.

(56) References Cited

U.S. PATENT DOCUMENTS

| 7,903,593 | B2 * | 3/2011 | Fuchs et al. | 370/310 |
| 2004/0266440 | A1 * | 12/2004 | Fuchs et al. | 455/445 |
| 2010/0273452 | A1 * | 10/2010 | Rajann et al. | 455/411 |
| 2010/0311468 | A1 * | 12/2010 | Shi et al. | 455/558 |

* cited by examiner

*Primary Examiner* — Joseph Arevalo
(74) *Attorney, Agent, or Firm* — Altis Law Group, Inc.

(57) ABSTRACT

A security system and method for an electronic device include comparing data in a Subscriber Identity Module (SIM) card with data in a virtual SIM card, if the virtual SIM card is not blank. The security system further include determining whether the electronic device has received a command of reporting loss of the SIM card from the network server, if the data in the SIM card is the same as the data in the virtual SIM card. The security method further includes running the electronic device normally if the electronic device has not received the command of reporting loss of the SIM card. If the command of reporting loss is received, a contact list and message of the electronic device are deleted and a calling function of the electronic device is disabled.

15 Claims, 3 Drawing Sheets

SECURITY SYSTEM AND METHOD FOR AN ELECTRONIC DEVICE

BACKGROUND

1. Technical Field

Embodiments of the present disclosure relate to security systems and methods, and in particular, to a security system and method for an electronic device.

2. Description of Related Art

Electronic devices (e.g., mobile phones) may store a plurality of personal and important information such as a contact list, messages, and calling records, for example. However, if the electronic devices are stolen or are lost, financial loss may occur, and important information may be leaked. Therefore, a security of system and method for protecting information of the electronic devices is necessary and important.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

In general, the word "module," as used herein, refers to logic embodied in hardware or firmware, or to a collection of software instructions, written in a programming language, for example, Java, C, or Assembly. One or more software instructions in the modules may be embedded in firmware, such as an EPROM. It will be appreciated that modules may comprised connected logic units, such as gates and flip-flops, and may comprise programmable units, such as programmable gate arrays or processors. The modules described herein may be implemented as either software and/or hardware modules and may be stored in any type of computer-readable medium or other computer storage system.

Figure 1:
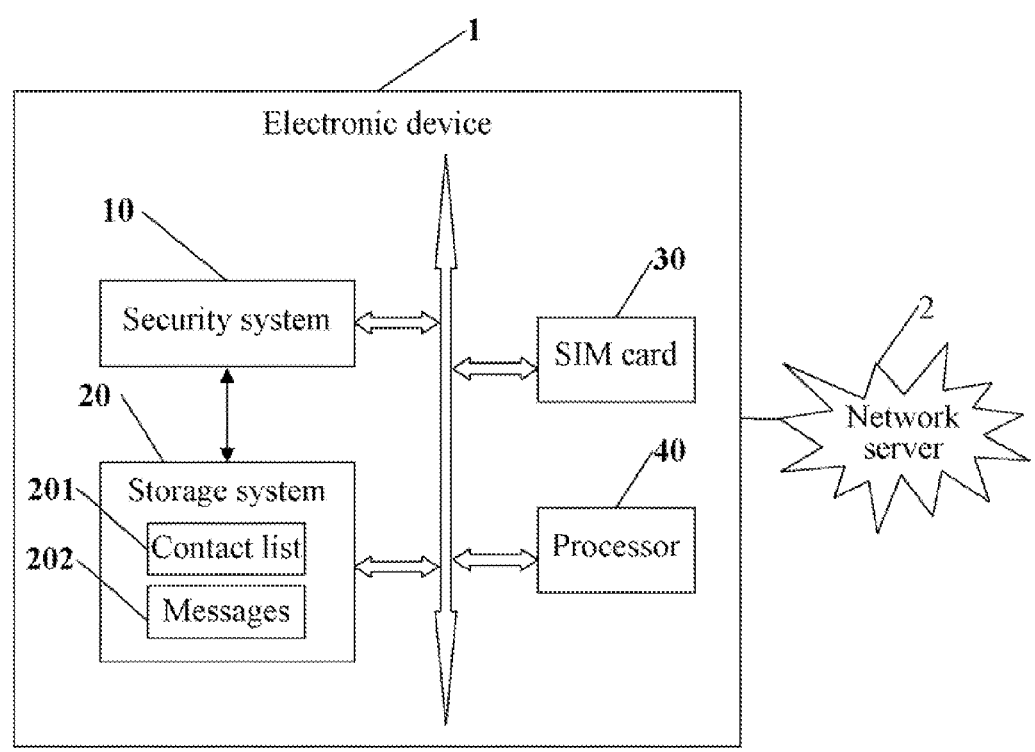
FIG. 1 is a schematic diagram of one embodiment of an electronic device including a burglarproof system.

FIG. 1 is a schematic diagram of one embodiment of an electronic device 1 including a security system 10. A Subscriber Identity Module (SIM) card 30 installed in the electronic device 1. The SIM card 30 of the electronic device 1 may include subscriber identity information, such as, International Mobile Subscriber Identification Number (IMSI), Key identifier (KI), and personal identification number (PIN), for example. The security system 10 may protect information in the electronic device 1 to avoid lost of important information if the electronic device 1 is stolen or lost.

The electronic device 1 further includes a storage system 20 and at least one processor 40. The storage system 20 stores a contact list 201 and messages 202 of the electronic device 1. The contact list 201 may include contacts information and related information of contacts in the electronic device 1. The messages 202 may be short messages of the electronic device 1. The storage system 20 may be a memory of the electronic device 1, or an external storage card, such as a smart media (SM) card, or a secure digital (SD) card. The at least one processor 40 executes one or more computerized codes of the electronic device 1 and other applications, to provide the functions of the security system 10.

The electronic device 1 is in electronic communication with a network server 2. The network server 2 is a server of a service provider of the SIM card 30. The network server 2 may define some predetermined commands, such as a predetermined command of reporting loss of SIM card 30, and/or a predetermined restarting command, for example. In some embodiments, the predetermined command of reporting the loss of the SIM card 30 may disable the SIM card 30, and the predetermined restarting command may re-enable the SIM card 30. The network server 2 may send the predetermined commands to the electronic device 1 through a wireless communication method (e.g., GSM, 3G). When a user lost the electronic device 1, the user may report loss of the SIM card 30 to the service provider of the SIM card 30, and the electronic device 1 may receive the predetermined command of reporting the loss of SIM card 30 from the service provider through the network server 2. If the user of the electronic device 1 requires the service provider to re-enable the SIM card 30, the electronic device 1 may receive the predetermined restarting command from the server provider through the network server 2.

Figure 2:
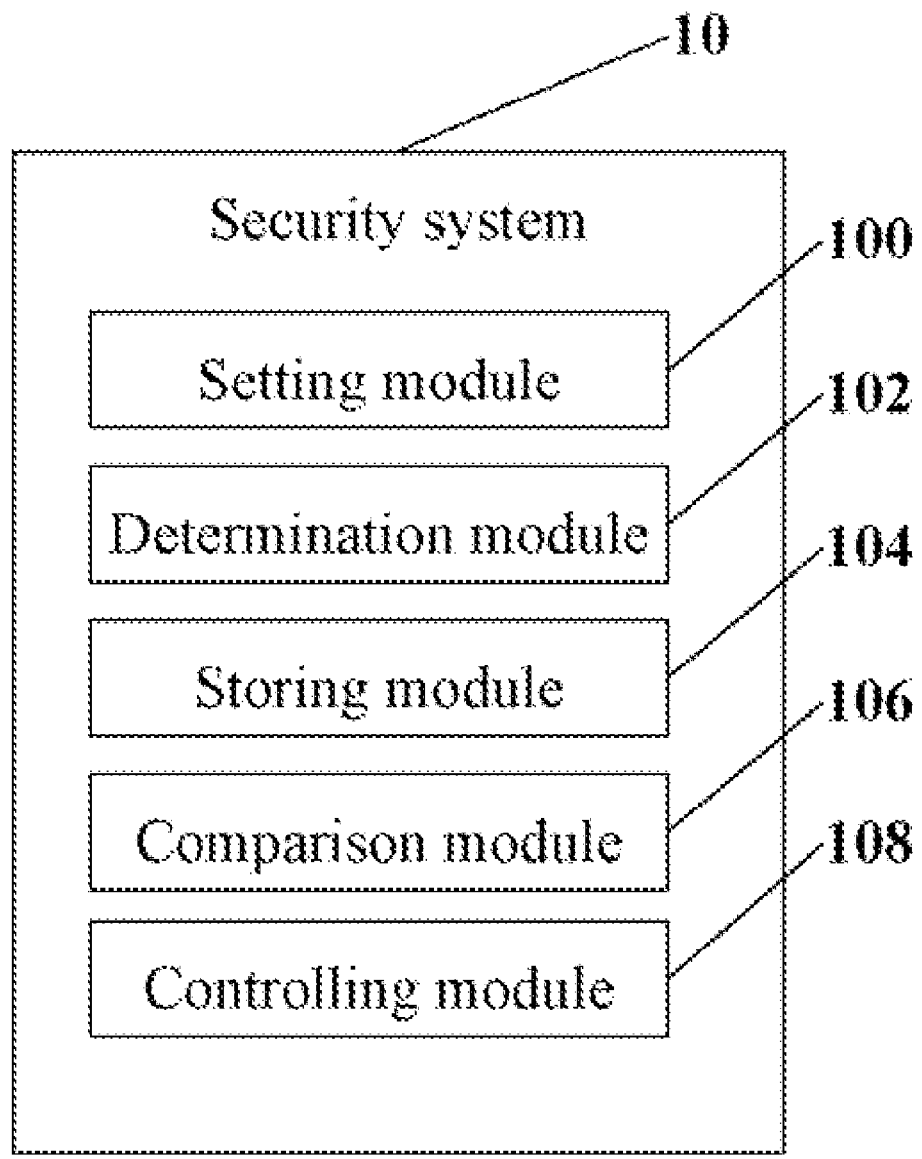
FIG. 2 is a block diagram of one embodiment of the security system of FIG. 1.

FIG. 2 is a block diagram of one embodiment of the security system 10 of FIG. 1. In some embodiments, the security system 10 includes a setting module 100, a determination module 102, a storing module 104, a comparison module 106, and a controlling module 108. The modules 100, 102, 104, 106, and 108 comprise computerized codes in the form of one or more programs that are stored in the storage system 20. The computerized code includes instructions that are executed by the at least one processor 40 to provide functions for modules 100, 102, 104, 106, and 108. Details of these operations follow.

The setting module 100 sets a command of reporting loss of the SIM card 30 and a restarting command for the electronic device 1, and establishes a virtual SIM card in the storage system 20. The command of reporting the loss of the SIM card 30 and the restarting command are in accordance with the predetermined command of reporting the loss and the predetermined restarting command defined by the network server 2. The virtual SIM card is a memory space in the storage system 20. Initially, the virtual SIM card is blank. "Blank" represents that there is no data in the virtual SIM card. The data represents the subscriber identity information in the SIM card 30.

The setting module 200 further sets a password for the electronic device 1, and may be used to unlock the electronic device 1 when entered correctly. The password may be a combination of numbers, letters, or other characters. The password can be reset and be modified according to user requirements.

The determination module 102 determines whether the virtual SIM card is blank, when the electronic device 1 is started.

If the virtual SIM card is blank, the storing module 104 writes and stores the data in the SIM card 30 into the virtual SIM card, and the electronic device 1 runs normally.

If the virtual SIM card is not blank, the comparison module 106 compares the data in the SIM card 30 of the electronic device 1 with the data in the virtual SIM card.

The determination module 102 further determines whether the data in the SIM card 30 is the same as the data in the virtual SIM card, according to the comparison.

If the data in the SIM card 30 is different from the data in the virtual SIM card, the controlling module 108 prompts the user to input a password, and the determination module 102 determines whether the input password is the same as the password. In some embodiments, the password can be entered using a keyboard or touchscreen (not shown in FIG. 1) of the electronic device 1.

If the input password is the same as the password, the controlling module 108 deletes the data in the virtual SIM card. In some embodiments, if the user wants to change another SIM card for the electronic device 1, the user should input the password.

If the input password is different from the password, the controlling module 108 disables functions of the contact list 201 and the messages 202 in the storage system 20, and the calling function of the electronic device 1. In some embodiments, if the calling function of the electronic device 1 is disabled, the electronic device 1 also may communicate with the network server 2.

If the data in the SIM card 30 is the same as the data in the virtual SIM card, the determination module 102 determines whether the electronic device 1 has received the command of reporting the loss of the SIM card 30 from the network server 2 at a predetermined interval.

If the electronic device 1 has not received the command of reporting the loss of the SIM card 30, the electronic device 1 runs normally. In some embodiments, when the electronic device 1 runs normally, the determination module 102 further determines whether the electronic device 1 has received the command of reporting the loss of the SIM card 30 at the predetermined interval.

If the electronic device 1 has received the command of reporting the loss of the electronic device 1, the controlling module 108 deletes the contact list 201 and messages 202 in storage system 20, and disables the calling function of the electronic device 1.

The determination module 102 further determines whether the electronic device 1 has received the restarting command from the network server 2.

The controlling module 108 further restarts the electronic device 1, upon the condition that the electronic device 1 has received the restarting command.

Figure 3:
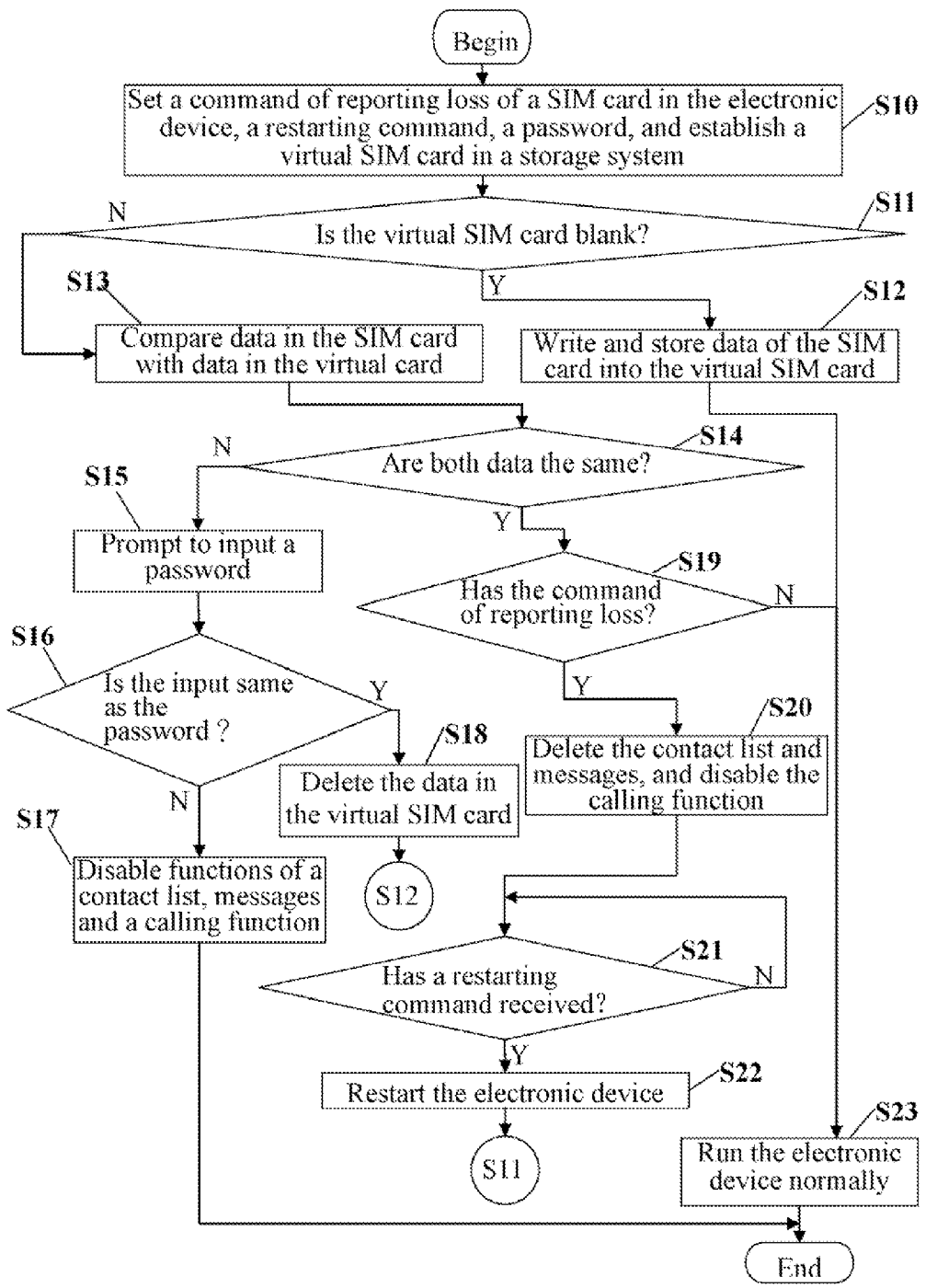
FIG. 3 is a flowchart of one embodiment of a security method for an electronic device, such as, that of FIG. 1.

FIG. 3 is a flowchart of one embodiment of a security method for an electronic device of FIG. 1. Depending on the embodiment, additional blocks may be added, others removed, and the ordering of the blocks may be changed.

In block S10, the setting module 100 sets a command of reporting loss of the SIM card 30, a restarting command for the electronic device 1, and a password, and establishes a virtual SIM card in the storage system 20. The command of reporting the loss of the SIM card 30 and the restarting command are in accordance with the predetermined command of reporting loss and the predetermined restarting command defined by the network server 2. The virtual SIM card is a memory space in the storage system 20. Initially, the virtual SIM card is blank, that is, there is no data in the virtual SIM card. The data represents the subscriber identity information of the SIM card 30.

In block S11, The determination module 102 determines whether the virtual SIM card is blank, when the electronic device 1 is started.

If the virtual SIM card is blank, in block S12, the storing module 104 writes and stores data in the SIM card 30 into the virtual SIM card, and block S23 is implemented.

If the virtual SIM card is not blank, in block S13, the comparison module 106 compares the data in the SIM card 30 of the electronic device 1 with the data in the virtual SIM card.

In block S14, The determination module 102 further determines whether the data in the SIM card 30 is the same as the data in the virtual SIM card.

If the data in the SIM card 30 is different from the data in the virtual SIM card, in block S15, the controlling module 108 prompts a user to input a password, and in block S16, the determination module 102 determines whether the input password is the same as the password.

If the input password is different from the password, in block S17, the controlling module 108 disables functions of the contact list 201 and the messages 202 in the storage system 20, and the calling function of the electronic device 1, the procedure goes to end.

If the input password is same as the password, in block S18, the controlling module 108 further deletes the data in the virtual SIM card, block S12 is repeated.

If the data in the SIM card 30 is same as the data in the virtual SIM card, in block S19, the determination module 102 determines whether the electronic device 1 has received the command of reporting the loss of the SIM card 30 from the network server 2 at a predetermined interval.

If the electronic device 1 has not received the command of reporting the loss of the SIM card 30, in block S23, the controlling module 108 runs the electronic device 1 normally.

If the electronic device 1 has received the command of reporting the loss of the SIM card 30, in block S20, the controlling module 108 deletes the contact list 201 and messages 202 in storage system 20, and disables the calling function of the electronic device 1.

In block S21, the determination module 102 further determines whether the electronic device 1 has received the restarting command from the network server 2.

If the electronic device 1 has received the restarting command from the network server 2, in block S22, the controlling module 108 further restarts the electronic device 1, and block S11 is repeated. If the electronic device 1 has not received the restarting command from the network server 2, block S21 is repeated.

It should be emphasized that the described exemplary embodiments are merely possible examples of implementations, and set forth for a clear understanding of the principles of the present disclosure. Many variations and modifications may be made to the-described exemplary embodiments without departing substantially from the spirit and principles of the present disclosure. All such modifications and variations are intended to be comprised herein within the scope of this disclosure and the-described inventive embodiments, and the present disclosure is protected by the following claims.

What is claimed is:

1. A computer-implemented security method for an electronic device, the electronic device in communication with a network server and comprising a storage system and a Subscriber Identity Module (SIM), the method comprising:

determining whether a virtual SIM card in the storage system is blank, upon the condition that the electronic device is started;

comparing data in the SIM card of the electronic device with data in the virtual SIM card, if the virtual SIM card is not blank;

determining whether the electronic device has received a command of reporting loss of the SIM card from the network server, upon the condition that the data in the SIM card is same as the data in the virtual SIM card;

running the electronic device normally, upon the condition that the electronic device has not received the command of reporting the loss of the SIM card; or deleting a contact list and messages in the storage system, and disabling a calling function of the electronic device, upon the condition that the electronic device has received the command of reporting the loss of the SIM card;

and further comprising determining whether the electronic device has received a restarting command from the network server, after the contact list and messages are deleted; and restarting the electronic device, upon the condition that the electronic device has received the restarting command.

2. The method as claimed in claim 1, wherein the method further comprises:

writing the data in the SIM card of the electronic device into the virtual SIM card, if the virtual SIM card is blank, and running the electronic device normally.

3. The method as claimed in claim 1, wherein the method further comprises:

setting the command of reporting the loss of the SIM card and the restarting command, to accord with a predetermined command of reporting loss and a predetermined restarting command defined by the network server.

4. The method as claimed in claim 1, wherein the method further comprises:

setting a password for the electronic device.

5. The method as claimed in claim 4, wherein the method further comprises:

prompting a user to input a password, upon the condition that the data in the SIM card is different from the data in the virtual SIM card;

disabling functions of the contact list and the messages, and the calling function, upon the condition that the input password is different from the password; or deleting the data in the virtual SIM card and returning the step of writing the data in the SIM card into the virtual SIM card, upon the condition that the input password is the same as the password.

6. A Non transitory computer-readable medium storing a set of instructions, the set of instructions capable of executed by a processor to perform a security method for an electronic device, the electronic device in communication with a network server, the method comprising:

determining whether a virtual Subscriber Identity Module (SIM) card in a storage system of the electronic device is blank, upon the condition that the electronic device is starting;

comparing data in a SIM card of the electronic device with data in the virtual SIM card, if the virtual SIM card is not blank;

determining whether the electronic device has received a command of reporting loss of the electronic device from the network server, upon the condition that the data in the SIM card is same as the data in the virtual SIM card;

running the electronic device normally, upon the condition that the electronic device has not received the command of reporting the loss of the SIM card; or deleting a contact list and messages in the storage system, and disabling a calling function of the electronic device, upon the condition that the electronic device has received the command of reporting the loss of the SIM card; and further comprising determining whether the electronic device has received a restarting command from the network server, after the contact list and messages are deleted; and restarting the electronic device, upon the condition that the electronic device has received the restarting command.

7. The storage medium as claimed in claim 6, wherein the method further comprises:

writing the data in the SIM card of the electronic device into the virtual SIM card, if the virtual SIM card is blank, and running the electronic device normally.

8. The storage medium as claimed in claim 6, wherein the method further comprises:

setting the command of reporting the loss of the SIM card and the restarting command, to accord with a predetermined command of reporting loss and a predetermined restarting command defined by the network server.

9. The storage medium as claimed in claim 6, wherein the method further comprises:

setting a password for the electronic device.

10. The storage medium as claimed in claim 9, wherein the method further comprises:

prompting a user to input a password, upon the condition that the data in the SIM card is different from the data in the virtual SIM card;

disabling functions of the contact list and the messages, and the calling function, upon the condition that the input password is different from the password; or deleting the data in the virtual SIM card and returning the step of writing the data in the SIM card into the virtual SIM card, upon the condition that the input password is the same as the password.

11. An electronic device in communication with a network server, comprising:

a Subscriber Identity Module (SIM) card;

a storage system for storing a contact list and messages;

at least one processor; and one or more programs stored in the storage system, executable by the at least one processor, the one or more programs comprising:

a determination module operable to determine whether a virtual SIM card in the storage system is blank, upon the condition that the electronic device is starting;

a comparison module operable to compare data in the SIM card with data in the virtual SIM card, if the virtual SIM card is not blank;

the determination module operable to determine whether the electronic device has received a command of reporting loss of the electronic device from the network server, upon the condition that the data in the SIM card is same as the data in the virtual SIM card;

a controlling module operable to run the electronic device normally, upon the condition that the electronic device has not received the command of reporting the loss of the SIM card;

the controlling module further operable to delete a contact list and messages in the storage system, and disable a calling function of the electronic device, upon the condition that the electronic device has received the command of reporting the loss of the SIM card; and further comprising determining whether the electronic device has received a restarting command from the network server, after the contact list and messages are deleted; and restarting the electronic device, upon the condition that the electronic device has received the restarting command.

12. The electronic device as claimed in claim 11, wherein the electronic device further comprises:

a storing module operable to writes the data in the SIM card into the virtual SIM card, if the virtual SIM card is blank; and the controlling module further operable to run the electronic device normally.

13. The electronic device as claimed in claim 11, wherein the electronic device further comprises:

a setting module operable to set the command of reporting the loss of the SIM card and the restarting command, to accord with a predetermined command of reporting loss and a predetermined restarting command defined by the network server.

14. The electronic device as claimed in claim 13, wherein the setting module further operable to set a password for the electronic device.

15. The electronic device as claimed in claim 11, wherein the controlling module further operable to prompt a user to input a password, upon the condition that the data in the SIM card is different from the data in the virtual SIM card;
   disable functions of the contact list and the messages, and the calling function, upon the condition that the input password is different from the password; and
   delete the data in the virtual SIM card, upon the condition that the input password is the same as the password.

* * * * *